United States Patent
Lee et al.

(10) Patent No.: US 9,332,096 B2
(45) Date of Patent: May 3, 2016

(54) MOBILE TERMINAL

(71) Applicant: LG ELECTRONICS INC., Seoul (KR)

(72) Inventors: Bohyoung Lee, Seoul (KR); Hanseok Chae, Seoul (KR); Minho Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/701,641

(22) Filed: May 1, 2015

(65) Prior Publication Data

US 2015/0237182 A1 Aug. 20, 2015

Related U.S. Application Data

(62) Division of application No. 14/229,224, filed on Mar. 28, 2014, now Pat. No. 9,049,409.

(30) Foreign Application Priority Data

Jun. 14, 2013 (KR) .................. 10-2013-0068538
Jul. 8, 2013 (KR) .................. 10-2013-0079887

(51) Int. Cl.
*H04M 1/02* (2006.01)
(52) U.S. Cl.
CPC .................. *H04M 1/0266* (2013.01)

(58) Field of Classification Search
None
See application file for complete search history.

(56) References Cited

U.S. PATENT DOCUMENTS

| 3,967,253 A | 6/1976 | Tsuruishi |
| 2010/0245706 A1* | 9/2010 | Oohira ............. G02F 1/133308 349/58 |
| 2011/0187960 A1* | 8/2011 | Kobayashi ............. H01J 9/20 349/58 |
| 2012/0172481 A1 | 7/2012 | Ha et al. |
| 2012/0281383 A1* | 11/2012 | Hwang ............. G02F 1/133308 361/807 |
| 2013/0021782 A1 | 1/2013 | Yan et al. |

* cited by examiner

*Primary Examiner* — Michael Teitelbaum
(74) *Attorney, Agent, or Firm* — Dentons US LLP

(57) ABSTRACT

A mobile terminal includes: a display module formed to output image information to one surface thereof; a window covering one surface of the display module; and a bonding member formed on an upper surface of the display module to bond the window to the display module, wherein the bonding member extends from the upper surface of the display module to one point of a rear surface the display module through a lateral surface of the display module to integrally fix a liquid crystal display (LCD) panel and a backlight module installed in the display module, and the display module is disposed between a rear surface of the window and a case forming the exterior of a terminal body.

6 Claims, 15 Drawing Sheets

MOBILE TERMINAL

CROSS REFERENCE TO RELATED APPLICATIONS

This application is a divisional application of Ser. No. 14/229,224, filed Mar. 28, 2014, now allowed, which claims the benefit of Korean Application No. 10-2013-0068538, filed on Jun. 14, 2013 and Korean Application No. 10-2013-0079887, filed on Jul. 8, 2013 the contents of which is incorporated by reference herein in its entirety

BACKGROUND OF THE INVENTION

1. Field of the Invention

The present invention relates to a coupling structure of a display module, a window, and a case.

2. Description of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

Recently, in order to provide terminals having a simple exterior and providing a convenient user interface, displays tend to be formed on front sides of terminals. In particular, as a multimedia function of terminals weighs, terminals displaying a larger screen for the same area are preferred. Thus, a structure of a mobile terminal having bezel minimized with respect to a display is required.

Also, to meet user needs, a method of reducing a size of a region (a bezel of a terminal), excluding a region of a front surface of a terminal in which image information is output, to relatively increase a size of a screen providing image information may be considered.

SUMMARY OF THE INVENTION

An aspect of the present invention is to provide a mobile terminal in which a width of a bezel is reduced.

Another aspect of the present invention is to provide a mobile terminal in which a size of a screen providing image information to users is increased by reducing a size of a bezel.

Another aspect of the present invention is to provide a mobile terminal providing a new coupling structure of a display and a case.

According to an embodiment of the present invention, there is provided a mobile terminal including: a display module formed to output image information to one surface thereof; a window covering one surface of the display module; and a bonding member formed on an upper surface of the display module to bond the window to the display module, wherein the bonding member extends from the upper surface of the display module to one point of a rear surface of the display module through a lateral surface of the display module to integrally fix a liquid crystal display (LCD) panel and a backlight module installed in the display module, and the display module is disposed between a rear surface of the window and a case forming the exterior of a terminal body.

The mobile terminal may further include: a display module installation member attached to the rear surface of the display module, extends to the lateral surface of the display module, and having an outer surface being in contact with the bonding member.

The bonding member may include a first portion formed between the display module and the window, a second portion extending from the first portion and bent to cover the display module, and a third portion extending from the second portion and disposed in a lateral surface of the display module installation member. The bonding member may include a fourth portion formed to one point of a rear surface of the display module installation member, wherein the fourth portion may be formed to extend from the third portion or at least a portion of the fourth portion may be attached to an outer side of the third portion in an overlapping manner.

The mobile terminal may further include: a penetration preventing unit covering the lateral surface of the display module to prevent penetration of an adhesive to between layers forming the display module; and a bonding layer formed between lateral edges of an accommodation portion and the penetration preventing unit in order to bond the lateral surface of the display module to a portion of the accommodation portion facing the display module, wherein the accommodation portion may be formed on one surface of the case.

The case may have a plurality of slits formed on a bottom surface of the accommodation portion to allow an adhesive to be injected therethrough from the rear side of the case to form the bonding layer.

The slits may be formed on at least a portion of the terminal in a length direction and in a width direction.

The case may have a bridge portion formed between the slits to connect the slits.

The case may have a leakage preventing unit formed to be protruded from the case along the lateral edges thereof.

The penetration preventing unit may cover at least a portion of the display module to allow the layers forming the display module to form a single module.

The penetration preventing unit may be formed as at least one of an adhesive tape bonded to at least a portion of the display module and a frame supporting the display module.

The penetration preventing unit may include a frame covering the rear and lateral surfaces of the display module to support the display module and an adhesive tape covering a lateral surface of the frame and bonded to at least a portion of a front surface of the display module to bond the display module to the frame, and forming a blank in a portion of the lateral surface allowing the bonding layer and the frame to be partially in direct contact with each other.

The first portion may be formed by forming adhesive layers on both surfaces of a support layer, the adhesive layer may be formed on both surfaces or one surface of the support layer from one point of the second portion to the third portion, and the adhesive layer is formed on one surface of the support layer, the adhesive layer may be formed on a surface of the support layer facing the display module.

The fourth portion may be formed by forming an adhesive layer on one surface or both surfaces of the support layer, and the display module installation member may be a sheet formed of stainless steel (STS) or aluminum.

A touch sensor may be installed within the display module, and the LCD panel may include an upper polarizer plate, a lower polarizer plate, and first and second substrates disposed between the upper and lower polarizer plates, wherein the upper polarizer plate may be disposed to be aligned with an end of the first substrate.

An adhesive unit may be formed between the bonding member and the case.

According to the exemplary embodiments of the present disclosure, since the display module is fixed by using a bonding member without an additional structure in the mobile terminal, a bezel area of the mobile terminal may be minimized.

Also, by bonding the rear surface of the display module fixed to the case, an adhesive width of the bezel is removed, and since an already existing bonding member extends to be used, an additional assembling process or assembling tolerance may be reduced.

In addition, since the display and the case are coupled laterally, the display and the case may be coupled without a bonding surface allocated to a rear surface of a window for bonding in a thickness direction of the terminal, and thus, the size of the bezel may be reduced and a region of the window for outputting an image may be increased as much.

Also, since the display and the case are coupled by using a 2-axis dispenser, the mobile terminal may be manufactured without having to use a dispenser moving along three or more axes or a rotary dispenser.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Figure 1:
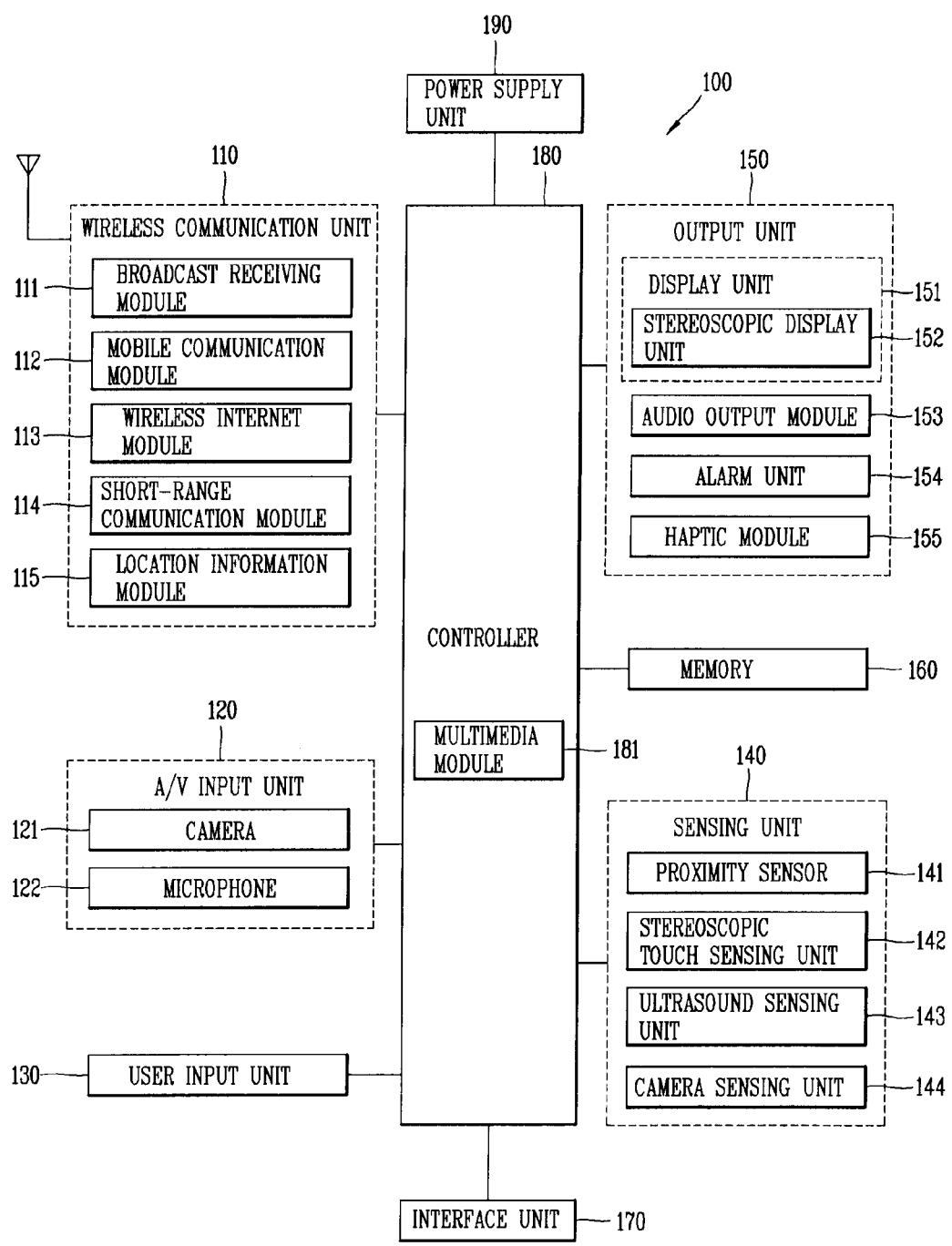
FIG. 1 is a block diagram of a mobile terminal according to an exemplary embodiment of the present disclosure.

The embodiments of the present invention will now be described with reference to the accompanying drawings, In the following description, usage of suffixes such as 'module', 'part' or 'unit' used for referring to elements is given merely to facilitate explanation of the present invention, without having any significant meaning by itself. The same or like reference numerals were used for he same or like components although they are in different exemplary embodiments, and first descriptions thereof will used for the other descriptions. As used herein, the singular forms "a", "an" and "the" are intended to include the plural forms as well, unless the context clearly indicates otherwise.

Mobile terminals described in the present disclosure may include mobile phones, smart phones, notebook computers, tablet computers, digital broadcast receivers, PDAs (Personal Digital Assistants), PMPs (Portable Multimedia Player), navigation devices, slate PCs, tablet PCs, ultra-books, and the like. However, it would be understood by a person skilled in the art that the configuration according to embodiments of the present invention can be also applicable to the fixed types of terminals such as digital TVs, desk top computers, and the like, except for any elements especially configured for a mobile purpose.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented. The elements of the mobile terminal will be described in detail as follows.

The wireless communication unit 110 typically includes one or more modules allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may refer to information associated with a broadcast channel, a broadcast program or a broadcast service provider. The broadcast associated information may also be provided via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System).

Referring to FIG. 1, the A/V input unit 120 is configured to receive an audio or video signal. The A/V input unit 120 may include a camera 121 and a microphone 122. The camera 121 processes image data of still pictures or video obtained by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate input data from commands entered by a user to control various operations of the mobile terminal. The user input unit 130 may include a keypad, a dome switch, a touch pad e.g., a touch sensitive member that detects changes in resistance, pressure, capacitance, etc. due to being contacted), a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of them may be configured to be transparent or light-transmissive to allow viewing of the exterior, which may be called transparent displays. A typical transparent display may be, for example, a TOLED (Transparent Organic Light Emitting Diode) display, or the like. Through such configuration, the user can view an object positioned at the rear side of the terminal body through the region occupied by the display unit 151 of the terminal body.

The mobile terminal 100 may include two or more display units according to its particular desired embodiment. For example, a plurality of display units may be separately or integrally disposed on one surface of the mobile terminal, or may be separately disposed on mutually different surfaces.

Meanwhile, when the display unit 151 and a sensor (referred to as a 'touch sensor', hereinafter) for detecting a touch operation are overlaid in a layered manner to form a touch screen, the display unit 151 may function as both an input device and an output device. The touch sensor may have a form of a touch film, a touch sheet, a touch pad, and the like.

The touch sensor may be configured to convert pressure applied to a particular portion of the display unit 151 or a change in the capacitance or the like generated at a particular portion of the display unit 151 into an electrical input signal. The touch sensor may be configured to detect the pressure when a touch is applied, as well as the touched position and area.

When there is a touch input with respect to the touch sensor, a corresponding signal (signals) are transmitted to a touch controller. The touch controller processes the signals and transmits corresponding data to the controller 180. Accordingly, the controller 180 may recognize which portion of the display unit 151 has been touched.

Referring to FIG. 1, a proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photoelectric sensor, an RF oscillation type proximity sensor, a capacitance type proximity sensor, a magnetic proximity sensor, an infrared proximity sensor, and the like. In case where the touch screen is the capacitance type, proximity of the pointer is detected by a change in electric field according to the proximity of the pointer. In this case, the touch screen (touch sensor) may be classified as a proximity sensor.

In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or the like.

The alarm unit 153 may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations. When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152. The display unit 151 and the audio output module 152 may be classified as a part of the alarm unit 153.

The haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2:
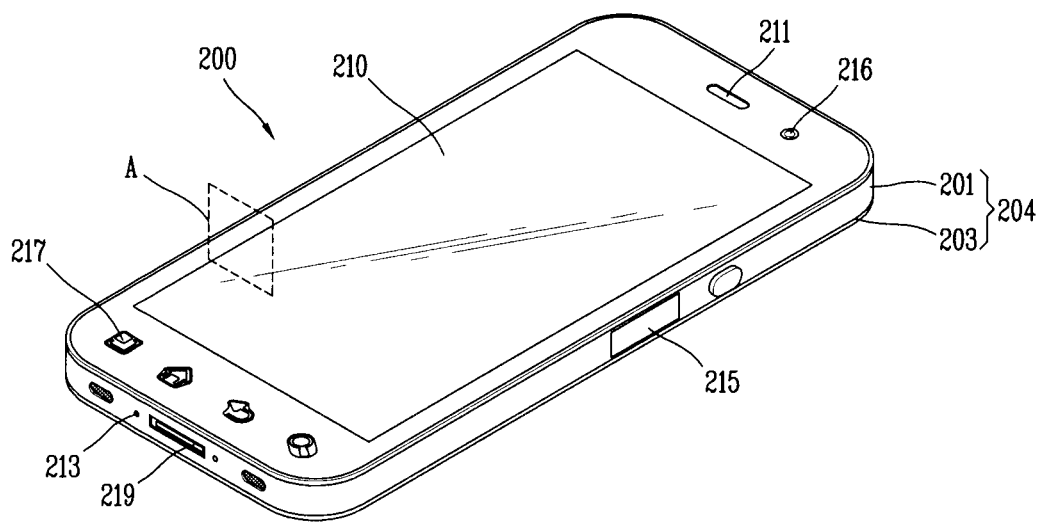
FIG. 2 is a front perspective view of a mobile terminal related to an exemplary embodiment of the present disclosure.
Figure 3:
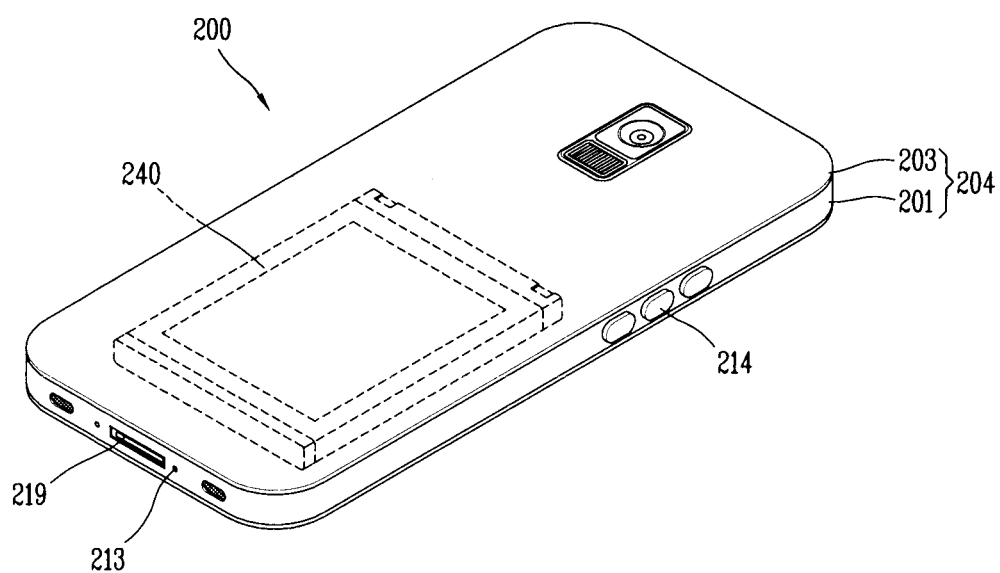
FIG. 3 is a rear perspective view of the mobile terminal of FIG. 2.

FIG. 2 is a front perspective view of the mobile terminal according to an embodiment of the present invention, and FIG. 3 is a rear perspective view of the mobile terminal illustrated in FIG. 2.

Referring to FIGS. 2 and 3, the mobile terminal 200 has a bar type terminal body. However, without being limited thereto, the present invention can be also applicable to a slide type mobile terminal, a folder type mobile terminal, a swing type mobile terminal, and the like, including two or more bodies which are coupled to be relatively movable. In addition, the mobile terminal described in the present disclosure may also be applicable to a certain mobile electronic device, e.g., a mobile phone, a smart phone, a notebook computer, a tablet computer, a digital broadcasting terminal, a personal digital assistant (PDA), a portable multimedia player (PMO), and the like.

The mobile terminal related to the present disclosure includes a terminal body 204 constituting the exterior thereof.

A case (or casing, housing, cover, etc.) constituting an external appearance of the terminal body 204 is formed by a front case 201, a rear case 202, and a battery case 203. The battery case 203 is formed to cover a rear surface of the rear case 202.

Various electronic components are installed in the space between the front case 201 and the rear case 202. The cases may be formed by injection-molding a synthetic resin or may be made of a metallic material such as stainless steel (STS) or titanium (Ti), etc.

A display unit 210, a first audio output unit 211, a front camera unit 216, a side key 214, an interface unit 215, and a signal input unit 217 are disposed on the front surface of the terminal body 204.

The display unit 210 may be implemented as a liquid crystal display (LCD) module for visually displaying information, an organic light emitting diode (OLED) module, an e-paper, and the like. The display unit 210 may include a touch sensing unit allowing for an inputting operation in a tactile manner. Hereinafter, the display unit 210 including the touch sensing unit will be referred to as a 'touch screen'. When a point on the touch screen 210 is touched, content corresponding to the touched position is input. The content input in the tactile manner may be characters, numbers, menu items that can be indicated or designated in various modes, and the like. The touch sensing unit may be light-transmissive to allow the display unit 210 to be seen, and may have a structure for enhancing visibility of the touch screen in a bright area. In FIG. 2, the touch screen 210 occupies a majority of the front surface of the front case 202.

The first audio output unit 211 may be implemented in the form of a receiver that transfers a speaker sound to the user's ear, or in the form of a loud speaker for outputting various alarm sounds or a multimedia reproduction sound of the mobile terminal 200.

The front camera unit 216 processes image frames such as image data or video obtained by an image sensor in a video call mode or an image capturing mode. The processed image frames may be displayed on a display unit 210.

The image frames processed by the front camera 216 may be stored in the memory 160 or transmitted to the outside via the wireless communication unit 110. Two or more front cameras 216 may be provided according to the configuration of the mobile terminal.

The signal input unit 217 is manipulated to receive a command for controlling the operation of the mobile terminal 200 and may include a plurality of input keys. The input keys may be generally referred to as a manipulating portion, and various methods and techniques may be employed as the manipulation portion so long as they are operated by the user in a tactile manner.

For example, the manipulation portion can be implemented as a dome switch, a touch screen, or touch pad which can receive information or commands input by the user in a pushing or touching manner, or implemented in a manner of using a wheel, a jog or a joystick to rotate keys. Content inputted by the signal input unit 217 may be variably set. For example, it may receive a command such as starting, ending, scrolling, etc.

The side key 214, the interface unit 215, the audio input unit 213, and the like, are disposed on the side of the front case 201.

The side key 214 may be generally called a manipulation unit, and configured to receive a command for controlling the operation of the mobile terminal 200. The side key 214 may employ any scheme so long as it can be manipulated in a tactile manner by the user. Content inputted by the side key 214 may be variably set. For example, a command for controlling the image input units 216 and 221, a command for adjusting of the size of the sound outputted from the audio output unit 211, or a command for changing the display unit 210 to a touch recognition mode, and the like, may be received by the side key 214.

The audio input unit 213 may be implemented in the form of a microphone in order to receive the user voice, other sounds, and the like.

The interface unit 215 may be used as a communication link (or passage, path, etc.) through which the mobile terminal 200 can exchange data, or the like, with an external device. For example, the interface unit 215 may be implemented in the form of a connection port for connecting an earphone to the mobile terminal via a wireline or wireless means, a port for short-range communications (e.g., an Infrared Data Association (IrDA) port, a Bluetooth™ port, a wireless LAN port, etc.), power supply ports for providing power to the mobile terminal 200, or the like. Also, the interface unit 215 may be a card socket for accommodating a SIM (Subscriber Identification Module) card or a UIM (User Identity Module) card, or an external card such as a memory card for storing information.

Figure 4:
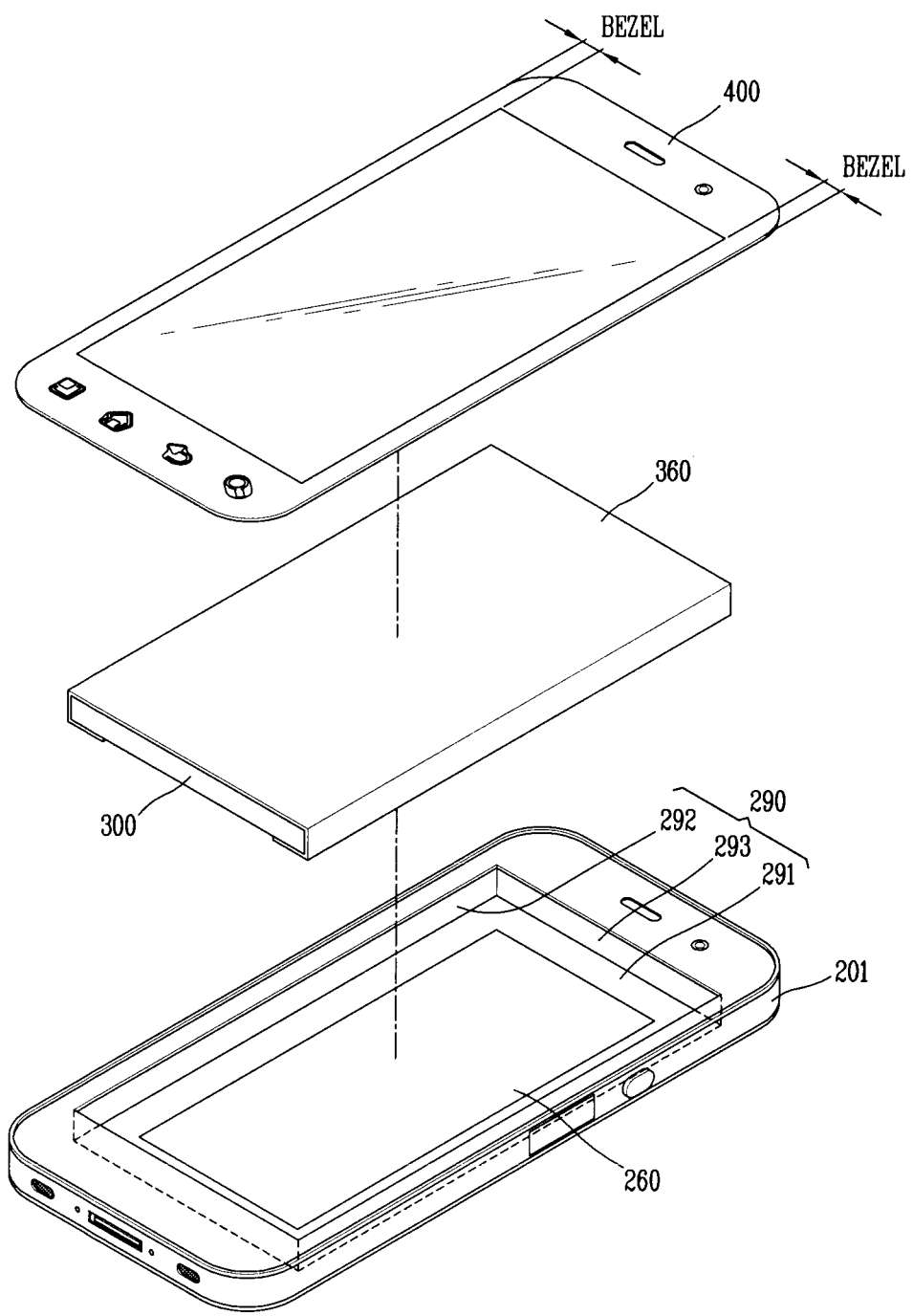
FIGS. 4 and 5 are exploded perspective view of the mobile terminal illustrated in FIG. 2, respectively.
Figure 5:
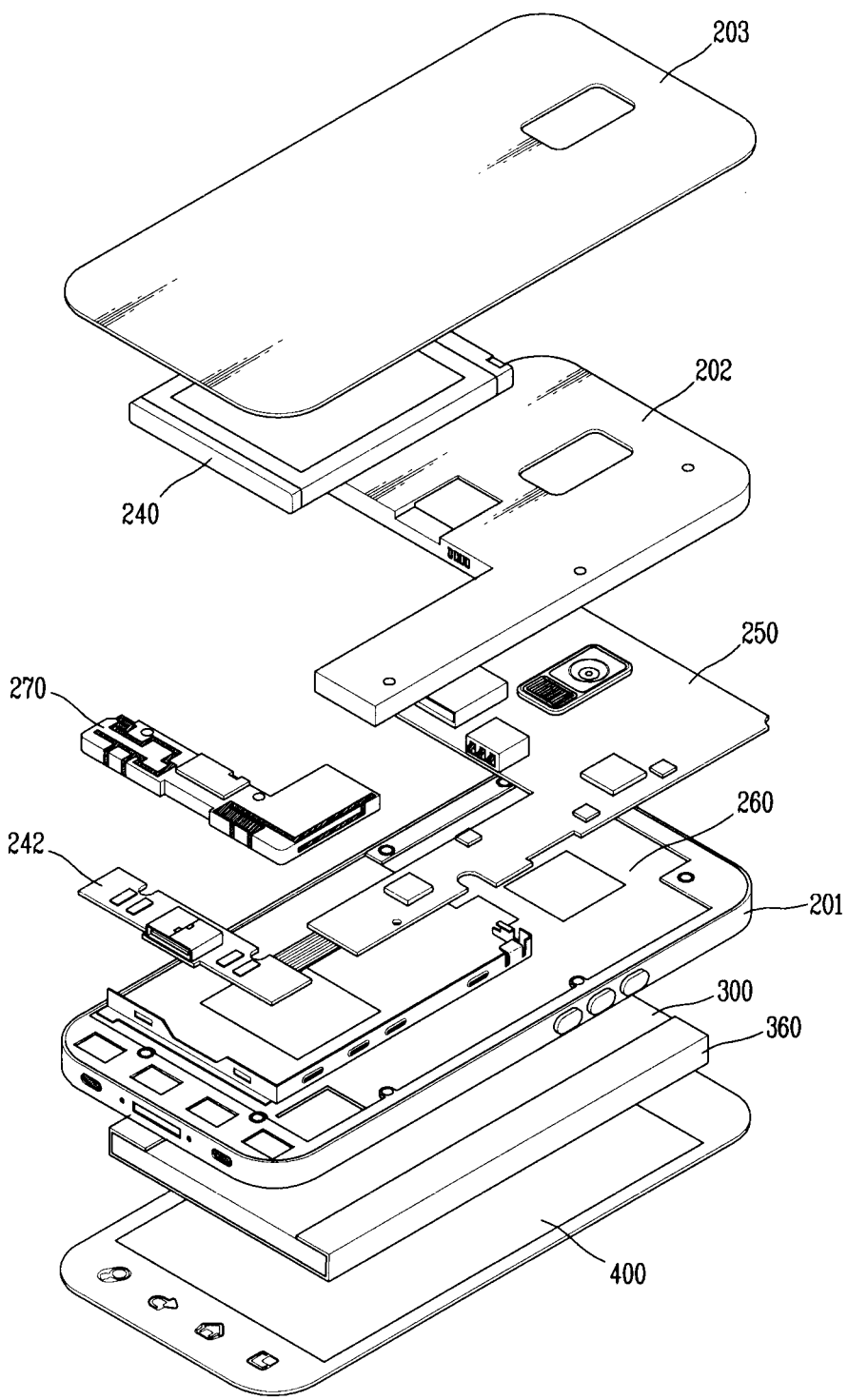

FIG. 4 is an exploded perspective view of FIG. 2 illustrating a coupling relationship between a display unit and a terminal body, and FIG. 5 is an exploded perspective view of FIG. 3 illustrating coupling of various devices installed on a rear surface of the mobile terminal.

Referring to FIGS. 4 and 5, the mobile terminal includes a window 400 and a display module 300 constituting the display unit 210. The window 400 may be coupled to one surface of the front case 201 or the display module 300. The window 400 and the display module 300 may be integrally formed.

A touch sensing pattern may be formed in the display module 300 to sense a touch. The touch sensing pattern may be formed to sense a touch input and formed to be light-transmissive. The display module 300 is installed in the terminal body. The terminal body may have an installation portion 290 formed to be depressed inwardly from one surface thereof to allow the display module 300 to be installed therein. The installation portion 290 may have a shape corresponding to the display module 300. A portion of the terminal body confining the installation portion 290 may be a case forming the exterior of the terminal. Namely, an inner side of the front case may be a lateral surface of the installation portion 290.

In the present exemplary embodiment, a thin film transistor-liquid crystal display (TFT LCD) is disclosed as an example of the display module 300, but the present disclosure is not limited thereto.

For example, the display module 300 may be a liquid crystal display (LCD), an organic light emitting diode (OLED), a flexible display, a 3D display, and the like.

Referring to FIG. 5, a frame 260 is formed to allow electrical elements to be supported between the front case 201 and the rear case 202. For example, the frame 260 is a support structure within the terminal and may support at least any one of the display module 300, a camera module, an antenna device, a battery 240, and a circuit board 250.

A portion of the frame 260 may be exposed to outside of the terminal. Also, the frame 260 may constitute a portion of a sliding module connecting a body unit and a display unit in a slide type terminal, not a bar type terminal.

FIG. 5 illustrates an example in which the circuit board 250 is disposed between the frame 260 and the rear case 202 and the display module 300 is coupled to one surface of the frame 260. The circuit board 250 and a battery are disposed on the other surface of the frame 260 and a battery case 203 may be coupled to the rear case 202 to cover the battery.

As discussed above, the circuit board 250 may be formed on one surface of the frame 260, but it may also be installed below the display module 300. Also, at least one electronic device is installed on a lower surface of the circuit board 250.

A depressed accommodation portion may be formed in the frame 260 to accommodate the battery 240. A contact terminal may be formed in one lateral surface of the battery accommodation portion and connected to the circuit board 250 to allow the battery 240 to provide power to the terminal body.

An antenna device may be formed in an upper or lower end of the mobile terminal. Also, a plurality of antenna devices may be disposed to be adjacent to the side of the terminal and each of the antenna devices may be formed to transmit and receive wireless signals having different frequency bands. Each of the antenna devices may be formed to include conductive patterns (not shown) formed on one surface of a carrier 270.

The frame 260 may be formed of a metal to have sufficient rigidity although the frame 260 is formed to have a small thickness. The metal frame 260 may operate as a ground. Namely, the circuit board 260 or the antenna devices may be ground-connected to the frame 260, and the frame 260 may operate as a ground of the circuit board 260 and the antenna devices. In this case, the frame 260 may extend a ground of the mobile terminal.

The circuit board 250 is electrically connected to the antenna devices, and processes a wireless signal (or a wireless electromagnetic wave) transmitted and received by the antenna device. A plurality of transceiver circuits may be formed or installed on the circuit board 250 to process wireless signals.

The transceiver circuits may include one or more integrated circuits (ICs) and relevant electrical devices. For example, the transceiver circuits may include a transmission IC, a reception IC, a switching circuit, an amplifier, and the like.

The plurality of transceiver circuits simultaneously power-feed conductive members formed as the conductive patterns, radiators, to allow the plurality of antenna devices to operate simultaneously. For example, if it is assumed that two antennas are provided, any one of the antenna devices transmits a signal, the other may receive a signal, or both antennas may transmit signals or receive signals.

A coaxial cable may be formed to connect the circuit board to the respective antennas. For example, the coaxial cable may be connected to a power feeding device that power-feeds the antenna devices. The power feeding device may be formed on one surface of a flexible circuit board 242 formed to process signals input from an operating unit (or manipulating unit) 217. The other surface of the flexible circuit board 242 may be coupled to a signal transmission unit formed to transmit a signal from the operating unit 217. In this case, a dome may be formed on the other surface of the flexible circuit board 242 and an actuator may be formed in the signal transmission unit.

Figure 6:
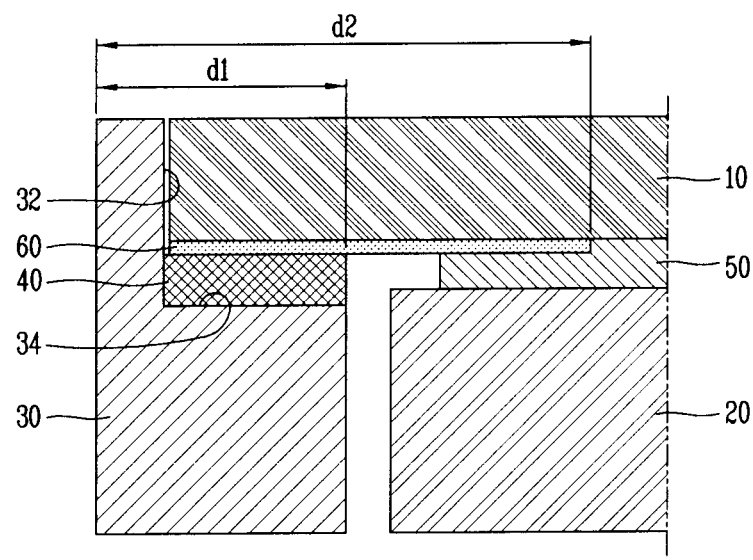
FIG. 6 is a cross-sectional view of a portion 'A' in FIG. 2 illustrating a comparative example in relation to the present disclosure.
Figure 7:
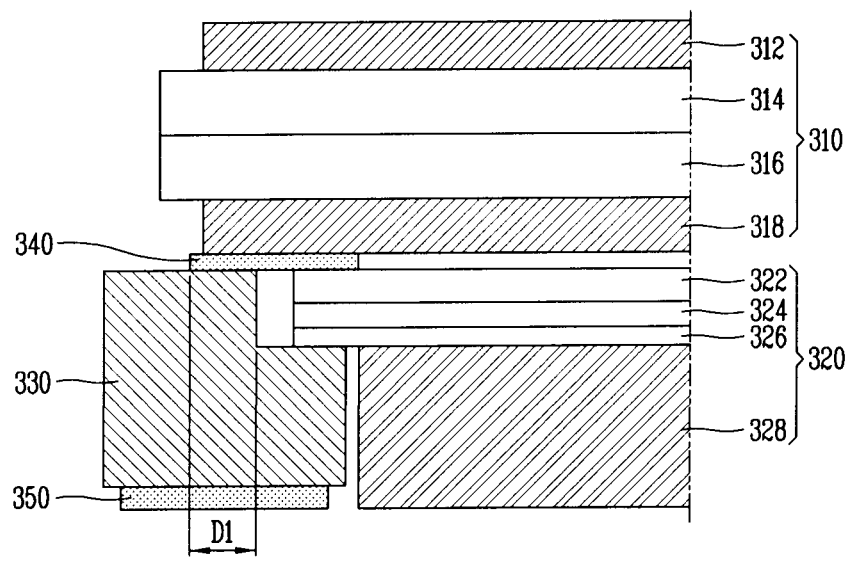
FIG. 7 is a cross-sectional view illustrating a display module according to the comparative example in relation to the present disclosure.

FIG. 6 is a cross-sectional view of a portion 'A' in FIG. 2 illustrating a comparative example in relation to the present disclosure, and FIG. 7 is a cross-sectional view illustrating a display module 300 according to the comparative example in relation to the present disclosure.

Referring to FIG. 6, in the related art, a window 10 is installed in an installation portion 34 of a case 30, and in this case, the window 10 is bonded by using an adhesive 40. Also, the window 10 and an LCD module 20 are fixed by a bonding unit 50 such as a super view resin (SVR). Here, the window 10 is tightly fixed to a lateral surface 32 of the case 30, and a window print region 60 is formed between the window 10 and the adhesive 40.

Thus, in the related art having the foregoing configuration, a bezel has a width of d2, and a width of the bezel according to bonding of the window 10 and the case 30 is d1.

In the present disclosure, a width d2 of the bezel is intended to be narrowed by not installing the window 10 in the case 30 to thus reduce the width d1.

Meanwhile, referring to FIG. 7, a light blocking tape (or light shielding tape) 340 is disposed between the LCD panel 310 and a backlight module 320 and a mold 330 is disposed on one side of the backlight module 320, so a portion of a lower end portion of the LCD panel 310 is attached to the case 330 by means of the light blocking tape 340. Here, since an attachment width D1 is approximately 0.2 mm, making the LCD module 310 easily separated from the backlight module 320 even by a small amount of external impact. Thus, it is required for the LCD module 310 and the backlight module 320 to be integrally formed.

Figure 8:
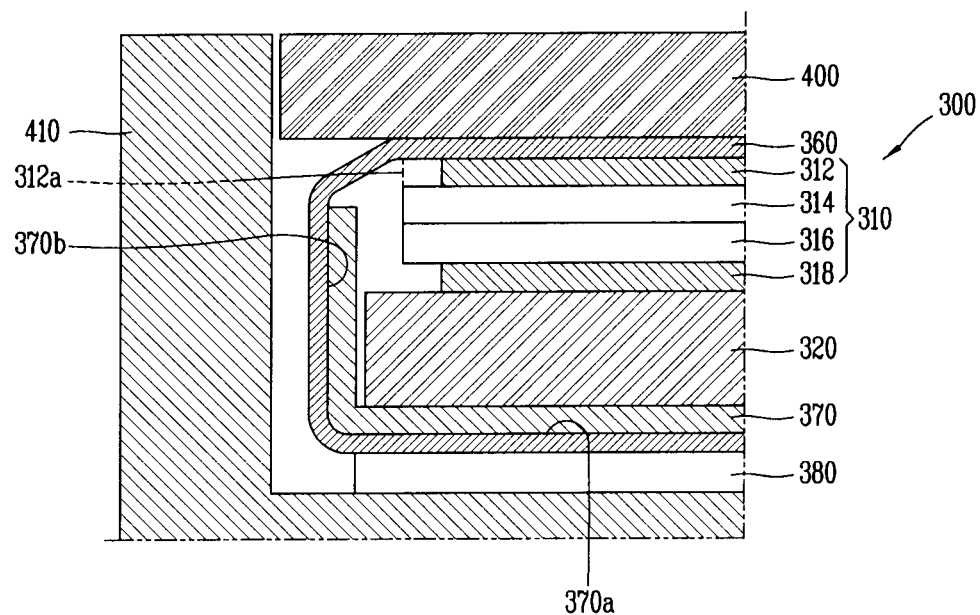
FIG. 8 is a cross-sectional view of a portion 'A' in FIG. 2 according to an exemplary embodiment of the present disclosure.

FIG. 8 is a cross-sectional view of a portion 'A' in FIG. 2 according to an exemplary embodiment of the present disclosure. Referring to FIG. 8, a window 400 is formed not to be installed in the case 410. Namely, the window 400 is attached to a bonding member 360, and the bonding member 360 integrally surrounds or covers the display module 300.

The display module 300 includes an LCD module 310 and a backlight module 320, and the backlight module 320 includes the mold 330. In addition, the backlight module 320 may include a reflective plate (not shown) attached to a lower end of a backlight unit 328.

In this case, the LCD module 310 includes an upper polarizer plate 312, a lower polarizer plate 318, and a color filter layer 314 and a thin film transistor (TFT) layer 316 provided between the upper polarizer plate 312 and the lower polarizer plate 318.

Also, the backlight module 320 includes a backlight unit 328, and a first diffusion layer 326, a second diffusion layer 324, and a light guide plate 322 formed on the backlight unit 328. The first diffusion layer 326 and the second diffusion layer 324 serve to diffuse light made incident from the backlight unit 328, and the light guide plate 322 serves to evenly distribute light to illuminate the LCD panel 310.

According to the exemplary embodiment of the present disclosure, the touch sensing pattern is installed within the display module 300, and only the bonding member 360 is disposed between the window 400 and the display module 300.

As illustrated in FIG. 8, the display module 300 according to the exemplary embodiment of the present disclosure includes the backlight module 320 and the LCD module 310 as an example constituting a display, disposed within the case 410. The LCD module 310 may be formed by laminating the TFT layer 316 and the color filter layer 314 between the upper polarizer plate 312 and the lower polarizer plate 318.

Also, according to the exemplary embodiment of the present disclosure, a display module installation member 370 may be disposed on a rear surface of the backlight module 320. The display module installation member 370 may include a horizontal portion 370*a* formed to be in contact with the rear surface of the backlight module 320 and a vertical portion 370*b* vertically extending from the horizontal portion 370*a*. Here, the vertical portion 370*b* is formed to be spaced apart at a predetermined interval from the side of the backlight module 320. This is to provide assembling tolerance.

In the exemplary embodiment of the present disclosure, the bezel refer to an outer edge portion in which a screen is not displayed, when the mobile terminal is viewed from a front side. As illustrated in FIG. 6, when the adhesive 40 is used, the bezel is increased by a space in which the adhesive 40 is disposed.

The present disclosure is devised to solve the above problem and proposes a method of minimizing a bezel area of a terminal by preventing the bezel area from being increased, while supporting sufficient bonding force although the window 400 is not installed in the case 410.

Hereinafter, a mobile terminal according to an exemplary embodiment of the present disclosure will be described with reference to FIG. 8.

First, the mobile terminal according to the exemplary embodiment of the present disclosure includes the display module 300 formed to output image information from one surface thereof, the window 400 covering an upper surface of the display module 300, and a bonding member 360 formed on the entire upper surface of the display module 300. According to an exemplary embodiment of the present disclosure, since a touch sensing panel is installed within the display module 300, the bonding member 360 may be formed on the window 500 and on the entire upper surface of the display module 300.

Also, the mobile terminal according to the exemplary embodiment of the present disclosure further includes a display module installation member 370 attached to a rear surface of the display module 300, extends to the side of the display module 300, and attached to the bonding member 360. As illustrated in FIG. 7, when the lower polarizer plate 318 and the mold 330 are fixed by the adhesive tape (or the light blocking tape) 340, a reflective plate disposed on a lower surface of the backlight unit 328 may be damaged to wrinkle, and here, the display module installation member 370 is installed to prevent force to act on the reflective plate to thus prevent the above problem.

Thus, the display module installation member 370 is formed of a sheet formed of stainless steel (STS) or aluminum.

Figure 9:
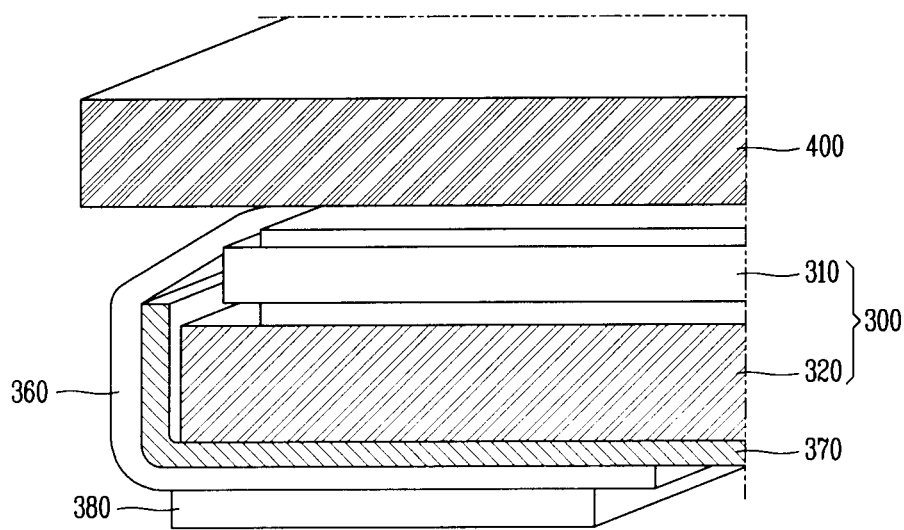
FIG. 9 is a perspective view illustrating coupling of a window and a display module according to an exemplary embodiment of the present disclosure.

FIG. 9 is a perspective view illustrating coupling of a window and a display module according to an exemplary embodiment of the present disclosure.

Figure 11:
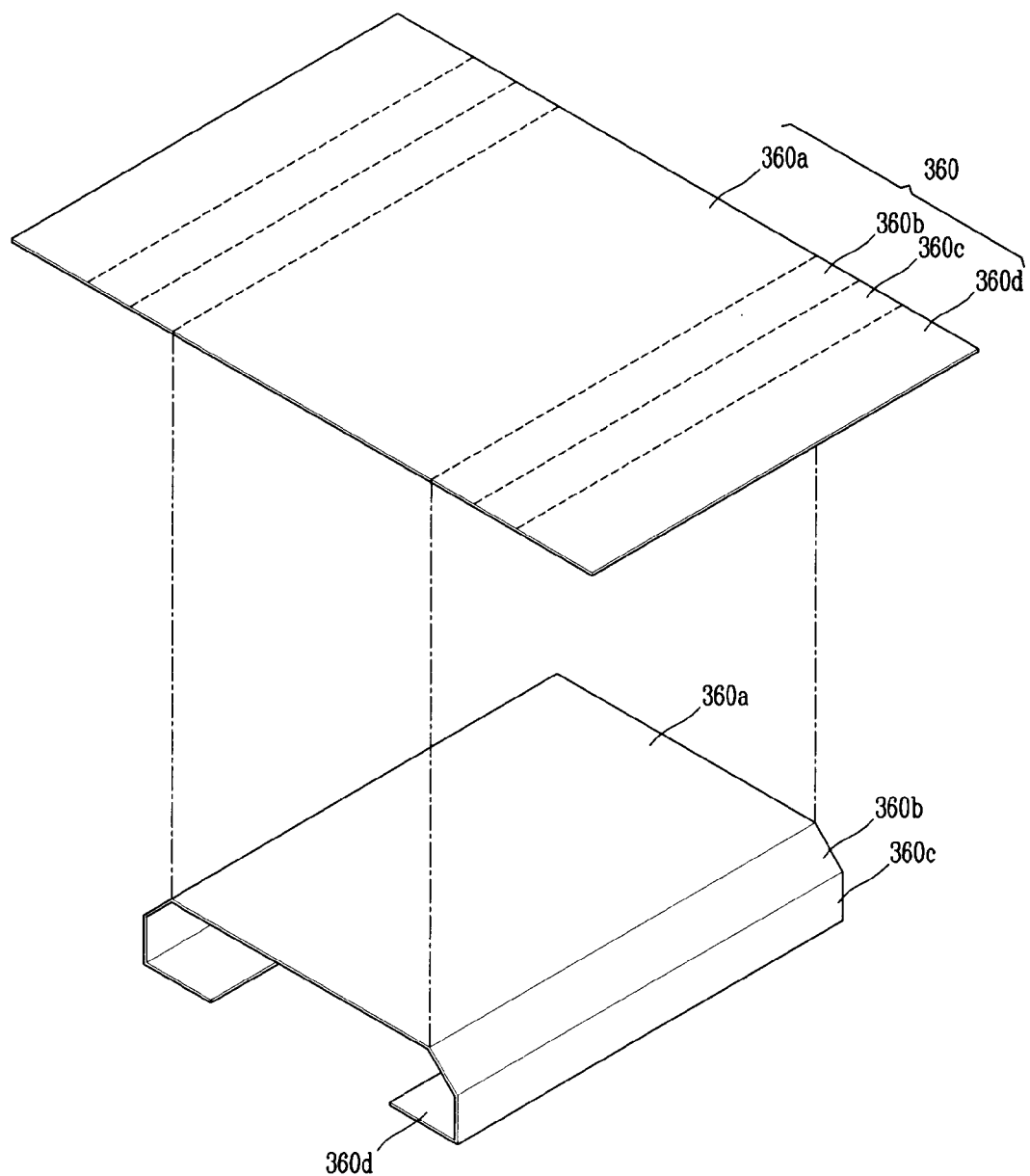
FIG. 11 is a perspective view of a bonding member in relation to an exemplary embodiment of the present disclosure.
Figure 12:
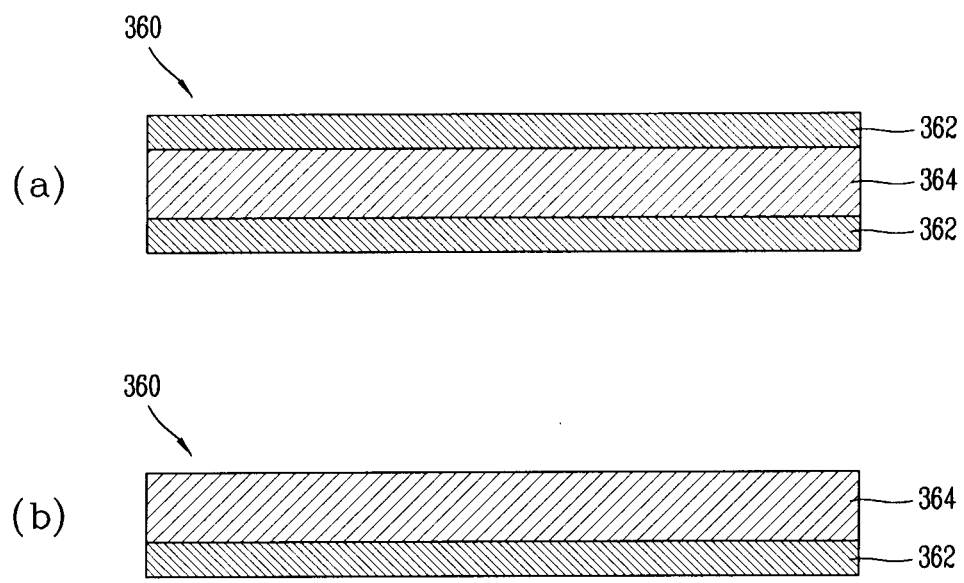
FIG. 12 is a cross-sectional view illustrating the bonding member in relation to an exemplary embodiment of the present disclosure.

Meanwhile, FIG. 11 is a perspective view of the bonding member 360 in relation to an exemplary embodiment of the present disclosure, and FIG. 12 is a cross-sectional view illustrating the bonding member 360 in relation to an exemplary embodiment of the present disclosure. Referring to FIGS. 11 and 12, the bonding member 360 according to the present exemplary embodiment includes a first portion 360a formed between the display module 300 and the window 400, a second portion 360b bent and extending from the first portion 360a, a third portion 360c extending from the second portion 360b and disposed on the side of the display module installation member 370, and a fourth portion 360d extending from the third portion 360c to reach a point of a rear surface of the display module installation member 370.

Figure 13:
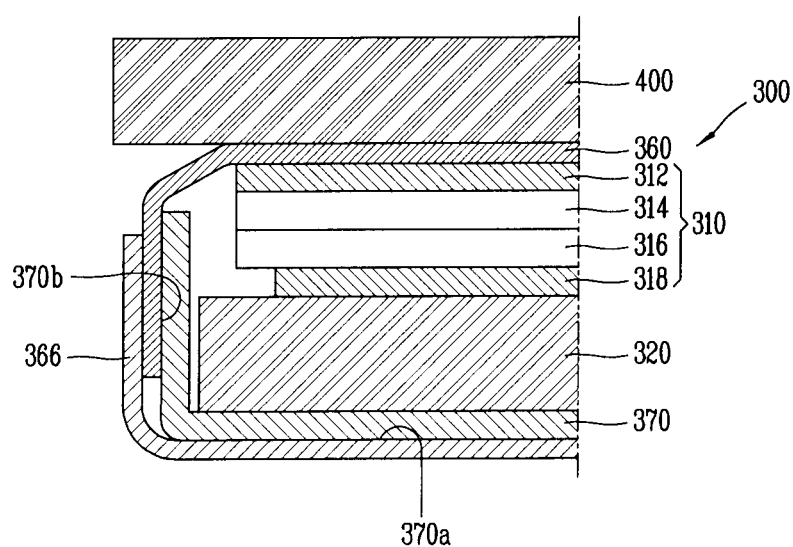
FIG. 13 is a cross-sectional view illustrating the bonding of a window and a display in relation to another exemplary embodiment of the present disclosure.

FIG. 13 is a cross-sectional view illustrating the bonding member in relation to another exemplary embodiment of the present disclosure. As illustrated in FIGS. 11 and 13, a bonding member 360 may include a first portion 360a formed between the display module 300 and the window 400, a second portion 360b bent and extending from the first portion 360a, a third portion 360c extending from the second portion 360b to reach a point of the side of the display module installation member 370, and a fourth portion 360d attached to an outer side of the third portion 360c and formed up to a point of a rear surface of the display module installation member 370

Meanwhile, the bonding member 360 may be a double-sided tape having adhesive layers 362 formed on both surfaces of a support layer 364 as illustrated in (a) of FIG. 12, or may be a single side tape in which the adhesive layer 362 is formed on one surface of the support layer 364 as illustrated in (b) of FIG. 12. In addition, the adhesive layer 362 may not be formed on both surfaces of the support layer 364.

In detail, the first portion 360a may be a double-sided tape as illustrated in (a) of FIG. 12, and the third portion 360c may be a single-sided tape as illustrated in (b) of FIG. 12. In this case, the double-sided tape includes an intermediate support layer 364, and the adhesive layers 362 are formed on both surfaces of the support layer 364. The support layer 364 may be a PET film, and the adhesive layer 362 may be an optical clear adhesive (OCA) film.

As mentioned above, in the exemplary embodiment of the present disclosure, the support layer 364 is provided in addition to the adhesive layer 362, and the reason for this is because, if the adhesive layer 362 is a liquid adhesive, it may not be able to properly fix the display module 300, so in the present exemplary embodiment, the display module 300 is fixed by using a transparent member such as PET.

Meanwhile, the bonding member 360 disposed between the window 400 and the display module 300 needs to be a double-sided bonding member, while the bonding member 360 in other regions, namely, in the lateral side and the rear side of the display module 300, may not need to be a double-sided bonding member. In particular, since no additional component is attached to the lateral side of the display module 300, specifically, to the lateral side of the display module installation member 370, only the support layer 364 may be sufficient to be provided. However, in the exemplary embodiment of the present disclosure, second portion 360b may be configured as a single-sided tape having the adhesive layer 362 formed on only one surface of the support layer 364, or may be configured as the support layer 364 without the adhesive layer 362. The single-sided tape or the single support layer may extend to the third portion 360c, and the third portion 360c is simply in contact with the side of the display module installation member 370, rather than being attached thereto. To this end, the adhesive layer 362 formed on the second portion 360b facing the display module 300 should be removed.

Also, the fourth portion 360d has the adhesive layer 362 formed on at least one surface of the support layer 364. The adhesive unit 380 having elasticity is attached to a rear surface of the fourth portion 360d. The adhesive unit 380 serves to tolerate impact when the display module 300 is installed in the terminal body. In this case, the adhesive unit 380 may be configured as a double-sided tape and, in this case, the fourth portion includes the adhesive layer 362 formed only one surface of the support layer 364.

The bonding member 360 extends from the upper surface of the display module to one point of the rear surface by way of the lateral surface such that the LED panel 310 and the backlight module 320 installed within the display module 300 are integrally fixed.

Meanwhile, according to the exemplary embodiment of the present disclosure, as illustrated in FIGS. 8, 10A through 10D, an upper polarizer plate 312a may be disposed in the same line as the color filter layer 314. In a case in which a liquid adhesive is used as the bonding member 360, approximately three days are required for the liquid adhesive to be hardened, and here, if an operation is performed before the bonding member 360 is completely hardened, air bubbles may be introduced. Thus, in order to prevent this, the upper polarizer plate 312a is protruded forwards relatively.

Hereinafter, a process of attaching the window 400 and the display module 300 and simultaneously integrating the display module will be described with reference to FIGS. 10A through 10D.

Figure 10A:
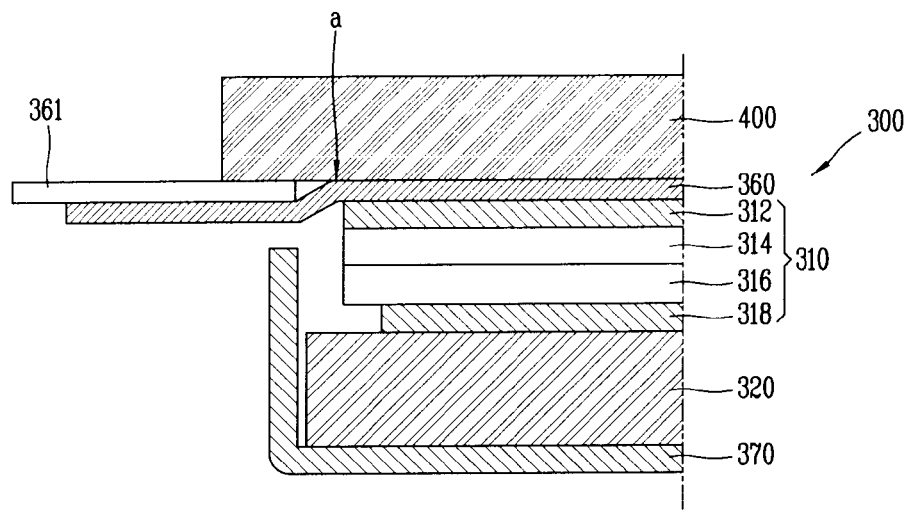
FIGS. 10A through 10D are conceptual views illustrating a process of coupling a window and a display in relation to an exemplary embodiment of the present disclosure.
Figure 10B:
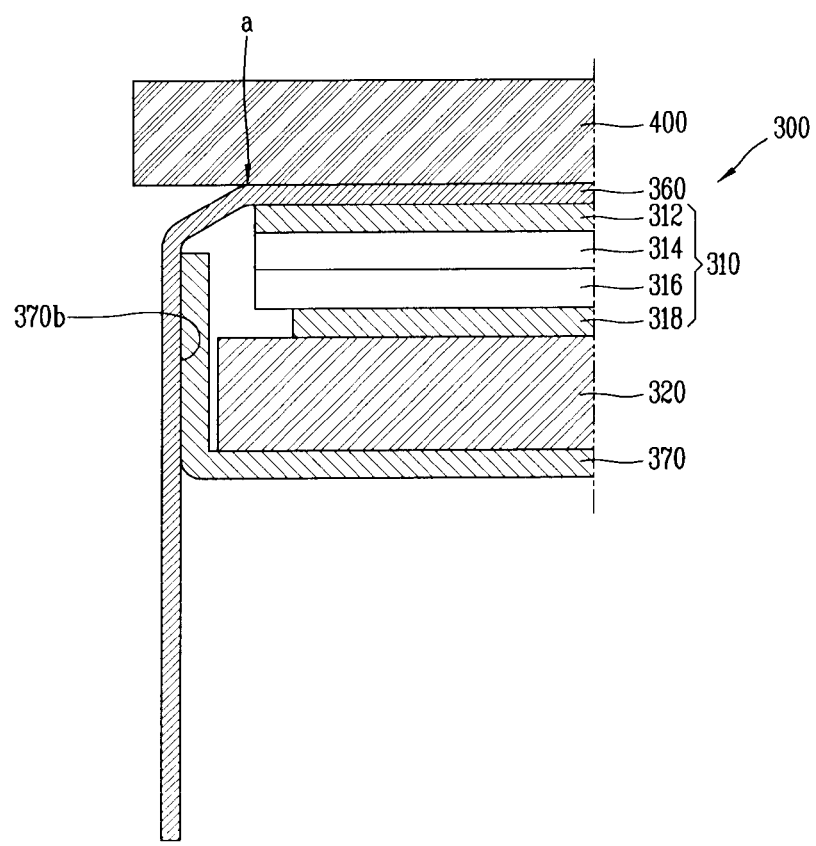

First, referring to FIG. 10A, the window 400 and the display module 300 are attached up to a point 'a' by using the bonding member 360 as a double-sided tape. Next, as illustrated in FIG. 10B, drafting paper 361 is removed. In this case, the adhesive layers 362 formed on both sides of the support layer 364 may be removed at one point of the section between 'a' and 'b'. Alternatively, only the adhesive layer 362 formed to face the display module installation member 370 may be removed. The bonding member 360 may be bent at points 'a' and 'b' by using a jig.

Figure 10C:
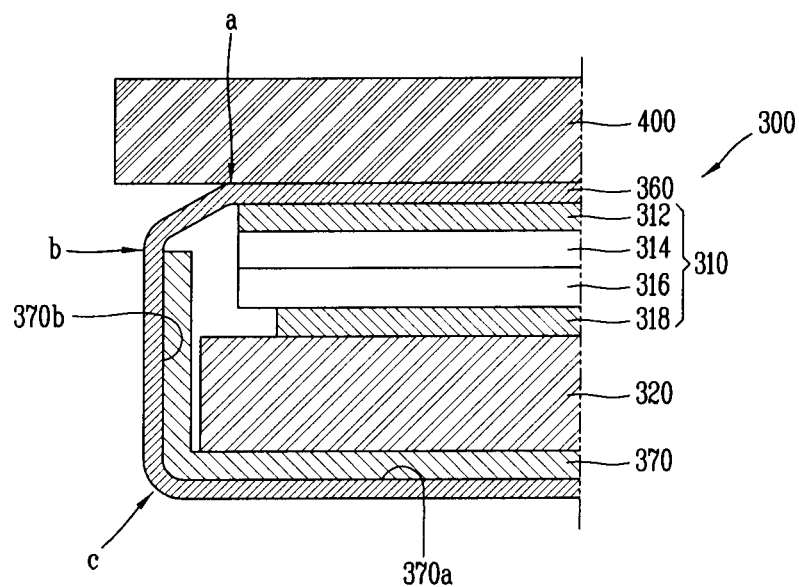
Figure 10D:
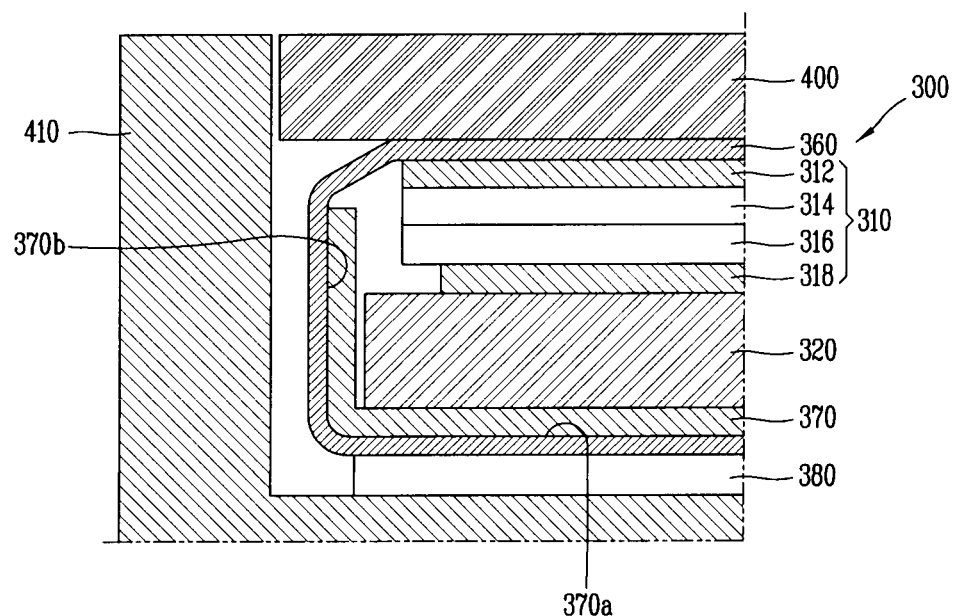

Thereafter, as illustrated in FIG. 10C, the bonding member 360 is bent at a point 'c' so as to be attached to the rear surface of the display module installation member 360, and finally, as illustrated in FIG. 10D, the display module 300 is installed in the case 410.

Hereinafter, another exemplary embodiment of the present disclosure will be described with reference to FIG. 13.

FIG. 13 is a cross-sectional view illustrating coupling between the window 400 and the display module 300 in according to an exemplary embodiment of the present disclosure. This exemplary embodiment is the same as the former exemplary embodiment, except that the bonding member 360 is separately formed and coupled, rather than being integrally formed.

Namely, the window 400 and the display module 300 are attached by using a first bonding member 360, and in this case, the first bonding member 360 extends to one point of the lateral surface of the display module installation member 370. A second bonding member 366 is formed outside of the first bonding member 360, attached to be coupled to the first bonding member 360, and attached to a rear surface of the display module installation member 370. In this case, the second bonding member 366 attached to the rear surface of the display module installation member 370 corresponds to the fourth portion 360d as described above. Namely, the second bonding member 366 may be formed as either a double-sided tape or a single-sided tape.

Hereinafter, a structure of a mobile terminal proposed in the present disclosure to minimize a size of a bezel will be described with reference to the partial cross-sectional views of FIGS. 14 through 17.

Figure 14:
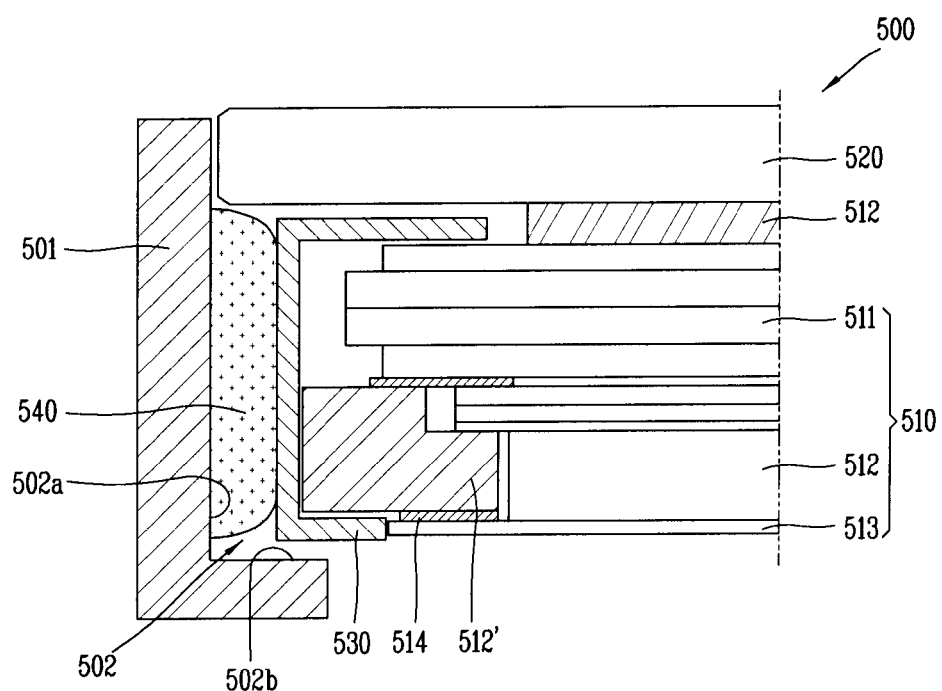
FIG. 14 is a partial cross-sectional view illustrating the mobile terminal of FIG. 2.

FIG. 14 is a partial cross-sectional view illustrating the mobile terminal 500 of FIG. 2.

A case 501 forms at least a partial exterior of a terminal body. The case 501 may be a front case or a rear case, and the front case and the rear case form at least a partial exterior of a front surface and a rear surface of the terminal body, respectively.

The case 501 includes an accommodation portion 502 accommodating the display module 510. The display module 510 may be formed to occupy majority of one surface of the terminal body, and thus, the accommodation portion may be formed such that one surface thereof is opened and an lateral surface 502a and a bottom surface 502b are provided.

The display module 510 is formed by laminating a plurality of layers, and here, the layers are laminated to form the single module. As illustrated, the display module 510 may include a display panel 511, a backlight unit 512, and a reflective plate (or a reflector) 513. A backlight unit mold 512' may be formed on the edge of the backlight unit 512. The backlight unit mold 512' may be formed to cover the edge of the backlight unit 512 to prevent release and delamination of layers forming the backlight unit 512 and bonded to the display panel 511 and the reflective plate 513 by means of a double-sided tape 514. Thus, the display module 510 may be formed as a single module.

The display module 510 formed as a single module may be coupled to the window 520 disposed to cover the display module 510, and the display module 510 coupled to the window 510 may be installed in the accommodation portion 502 of the case 501. The display module 510 and the window 520 may be bonded by an optical clear adhesive (OCA) or an optical clear resin (OCR) 515. In the state in which the window 520 is bonded to the display module 510, when the display module 510 is installed in the accommodation portion 502, the window 520 forms one surface of the terminal body.

A bonding layer 540 is disposed between a lateral surface of the display module 510 inserted in the accommodation portion 502 and a lateral surface 502a of the accommodation portion 502 to couple the display module 510 and the case 501 on the respective sides of the display module 510 and the case 501. Thus, an adhesive forming the bonding layer 540 is bonded in the lateral surface of the display module 510, a step to be bonded to a rear surface of the window 520 is not formed in the accommodation portion 502.

The display module 510 may be directly bonded to the case 501. In this case, however, the adhesive forming the bonding layer 540 may penetrate to between the layers forming the display module 510 during a bonding process according to viscosity of the adhesive, and thus, a penetration preventing unit 530 may be formed between the display module 510 and the bonding layer 540.

The penetration preventing unit 530 covers the lateral surfaces of the display module 510 in order to prevent penetration of the adhesive to between the layers forming the display module 510. The penetration preventing unit 530 may be formed as an adhesive tape and bonded to an upper surface of the layers forming the display module 510 and a lower surface of the backlight unit mold 512' to allow the layers forming the display module 510 to form a single module.

The double-sided tape 514 between the display panel 511 and the backlight unit mold 512' and between the backlight unit mold 512' and the reflective plate 513 may have a width as narrow as approximately 0.4 mm. Thus, the bonding tape is used to bond the upper surface of the display panel 511 and the lower surface of the backlight unit mold 512' in order to maintain the display module 510 as a single module. The penetration preventing unit 530 may serve to prevent the layers from being delaminated due to external impact, in particular, impact applied from the side, as well as preventing the adhesive of the bonding layer 540 from penetrating to between the layers of the display module 510.

If a bonding tape is bonded to both sides of the reflective plate 513 formed in the outermost portion, among the layers forming the display module 510, the reflective plate 513 may be locally deformed to cause an error in outputting normal image information. Thus, the bonding tap forming the penetration preventing unit 530 may be bonded to the backlight unit mold 512' and not bonded to the reflective plate 513.

When the penetration preventing unit 530 is disposed between the display module 510 and the case 501, the bonding layer 540 is formed between the lateral surface 502a of the accommodation portion 502 and the penetration preventing unit 530. Thus, the adhesive forming the bonding layer 540 bonds the penetration preventing unit 530 and the case 501.

When a step is formed in the accommodation portion 502, there is a limitation in reducing the bezel of the side where the window 520 is disposed in the terminal. In the exemplary embodiment of the present disclosure, since the case 501 is not bonded to the rear surface of the window 520 and the display module 510 is bonded laterally to the case 501, the bezel may be reduced to a size of 1 mm, compared to the case in which a step is formed.

Figure 15:
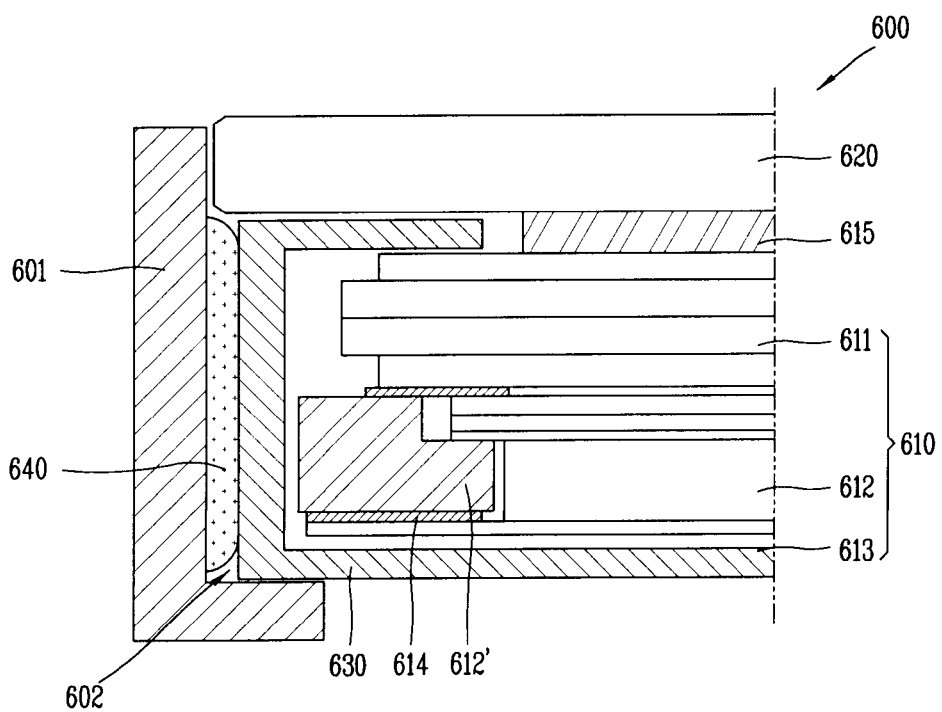
FIG. 15 is a partial cross-sectional view illustrating a mobile terminal in relation to another exemplary embodiment of the present disclosure.

FIG. 15 is a partial cross-sectional view illustrating a mobile terminal 600 in relation to another exemplary embodiment of the present disclosure.

A penetration preventing unit 630 may be configured as a frame supporting a display module 610. Unlike a soft adhesive tape, the frame may be formed of a rigid material and surrounds a rear surface, a lateral surface, and at least a portion of a front surface of the display module 610.

The frame covers at least a portion of the front surface of the display module 610 in order to maintain the display module 610 as a single module. A reflective plate 613 is a layer facing the frame. One surface of the reflective plate 613 is bonded to a backlight unit mold 612' by means of a double-sided tape 614. When a tape is bonded to both sides of the reflective plate 613, the reflective plate 613 may be deformed, so a double-sided tape is not disposed between the reflective plate 613 and the frame. Instead, the frame is formed to cover at least a portion of the front surface of the display module 610 to prevent the display module 610 from being released from the frame, and the frame prevents delamination of layers to allow the display module 610 to be maintained as a single module.

At least one surface of the frame is opened to allow the display module 610 and a window 620 to be coupled. As illustrated, when the size of the display module 610 has a width greater than the opened one surface of the frame, the display module 610 may not be coupled to the frame. Thus, at least a portion of the lateral surface of the frame may be opened to allow the display module 610 to be inserted from the lateral surface of the frame so as to be installed within the frame.

A bonding layer 640 is disposed between the side of an accommodation portion and the frame to laterally bond the frame and the case 601. Since the bonding layer 640 bonds the frame and the case 601 on the side of the display module 610, the case 601 may not have a step to be bonded to the rear surface of the frame 620, and thus, the bezel of the terminal may be minimized.

Figure 16:
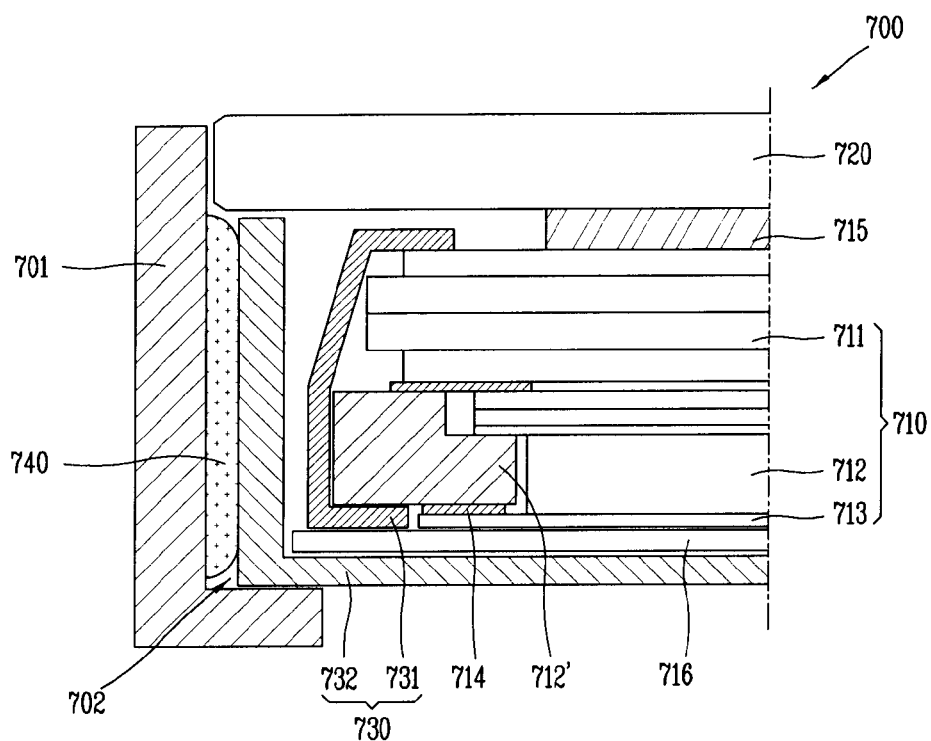
FIG. 16 is a partial cross-sectional view illustrating a mobile terminal in relation to another exemplary embodiment of the present disclosure.

FIG. 16 is a partial cross-sectional view illustrating a mobile terminal 700 in relation to another exemplary embodiment of the present disclosure.

A penetration preventing unit 730 may include an adhesive tape 731 surrounding the side of the display module 710 and a frame 732 formed to cover the adhesive tape 731 to supply the display module 710.

The adhesive tape 731 is bonded from a front surface of the display module 710 to a rear surface of a backlight unit mold 732' along the side of the display module 710.

The frame 732 is formed to cover the adhesive tape 731 and the rear side of the display module 710. Since the adhesive tape 731 is bonded to the front surface of the display module 710, although the frame 732 is not bonded to the front surface of the display module 710, a delamination phenomenon does not occur in the display module 710.

The frame 732 and the adhesive tape 731 are bonded by a double-sided tape 716. The adhesive tape 731 is a single-sided tape, so a side thereof bonded to the backlight unit mold 732' has adhesiveness, while the opposite side thereof does not have adhesiveness. Thus, the double-sided tape 716 is disposed between the side of the adhesive tape 731 without adhesiveness and the frame 732 to bond the frame 732 and the adhesive tape 731. In this case, when the double-sided tape 716 may have adhesiveness on both surfaces there're only in a portion between the backlight unit mold and the frame 732, and a portion thereof facing the reflective plate 713 does not have adhesiveness in order to prevent local deformation of the reflective plate 713.

The bonding layer 740 is disposed between the frame 732 and the accommodation portion, and an adhesive forming the bonding layer 740 bonds the case 701 and the display module 710 laterally. Since the display module 710 and the case 701 are bonded to be coupled to each other laterally, a step to be bonded to the rear surface of the window 720 is not formed in the case 701. Thus, the bezel of the terminal may be minimized.

Figure 17:
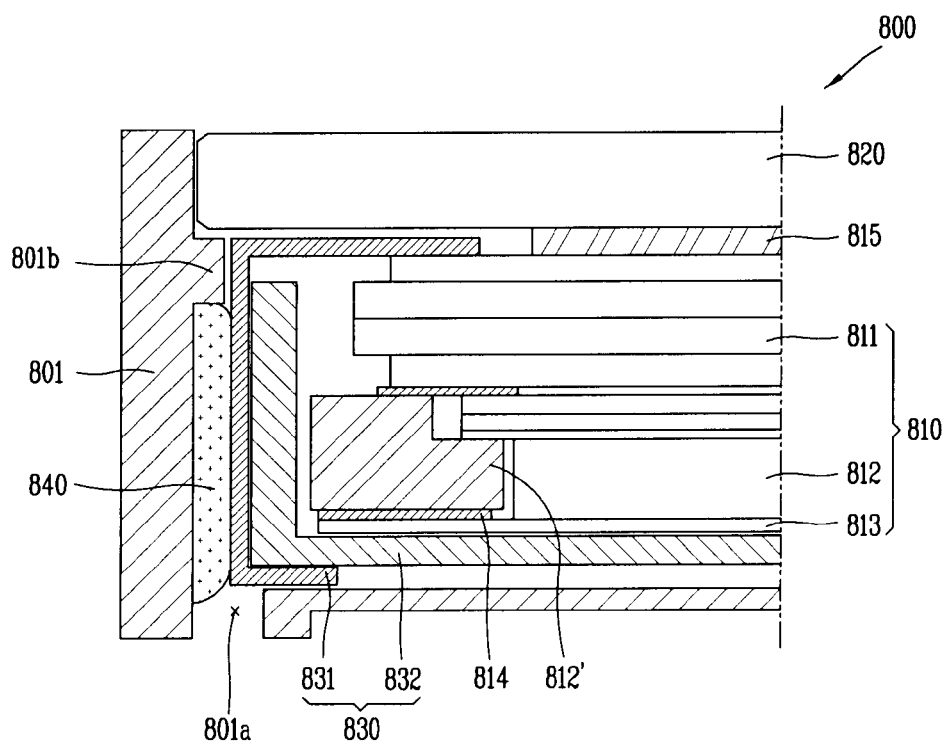
FIG. 17 is a partial cross-sectional view illustrating a mobile terminal in relation to another exemplary embodiment of the present disclosure.

FIG. 17 is a partial cross-sectional view illustrating a mobile terminal 800 in relation to another exemplary embodiment of the present disclosure.

Unlike the mobile terminal 700 illustrated in FIG. 16, a penetration preventing unit 830 of a mobile terminal 800 illustrated in FIG. 17 includes a frame 832 formed to a lateral surface and a rear surface of a display 810 and an adhesive tape 831 formed to cover a lateral surface of the frame 832.

Compared to the case of FIG. 16, the positions of the frame 832 and the adhesive tape 831 are interchanged, and similarly, a double-sided tape 814 is bonded only to one surface of the reflective plate 813 and not to a surface facing the frame 832. Instead, the adhesive tape 831 is formed to cover a portion of the front surface of the display 810, the lateral surface of the frame 832, and a portion of the rear surface, allowing layers forming the display module 810 to be formed as a single module.

A case 801 includes a slit 801a formed on the bottom surface of a accommodation portion to allow an adhesive to be injected from the rear surface to form a bonding layer 840. The adhesive is injected to the side of the adhesive tape 831 and the accommodation portion through the slit 801a to bond the penetration preventing unit 830 and the case 801.

The slit 801a may not be formed only in the case 801 of the mobile terminal 800 illustrated in FIG. 17, and it may also be formed in the cases 501, 601, and 701 of the mobile terminals 500, 600, and 700 illustrated in FIG. 16.

The slit 801a may be formed along at least a portion of the terminal in a length direction and a width direction to allow the adhesive to be injected by using a dispenser moving along two axes. In this case, any one of the axes along which the dispenser moves may be the length direction of the terminal and the other one may be the width direction.

The case 801 may have a leakage preventing unit 801b formed along the edges of the side of the accommodation portion to prevent leakage of an adhesive forming the bonding layer 840 through a gap between a window 820 and the lateral surface of the accommodation portion. The leakage preventing unit 801b is formed to be protruded from the side of the accommodation portion. The leakage preventing 801b serves to block a gap between the case 801 and the window 820, rather than being bonded to the window 820. Thus, compared to the case in which a step is formed to be bonded to a rear surface of the window 820, even though the leakage preventing unit 801b is formed in the case 801, the size of the bezel may still be minimized.

Figure 18:
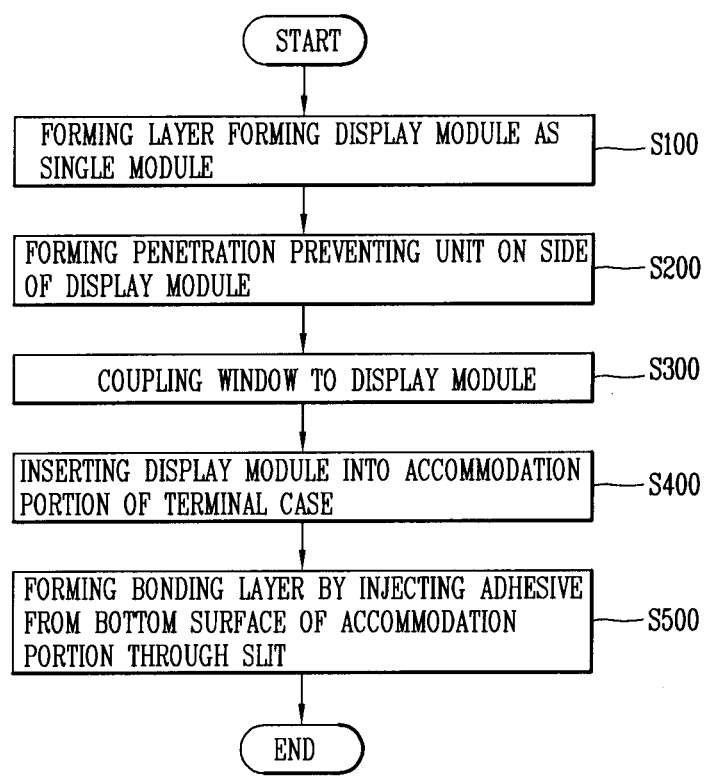
FIG. 18 is a flow chart illustrating a method of manufacturing a mobile terminal in relation to an exemplary embodiment of the present disclosure.
Figure 19:
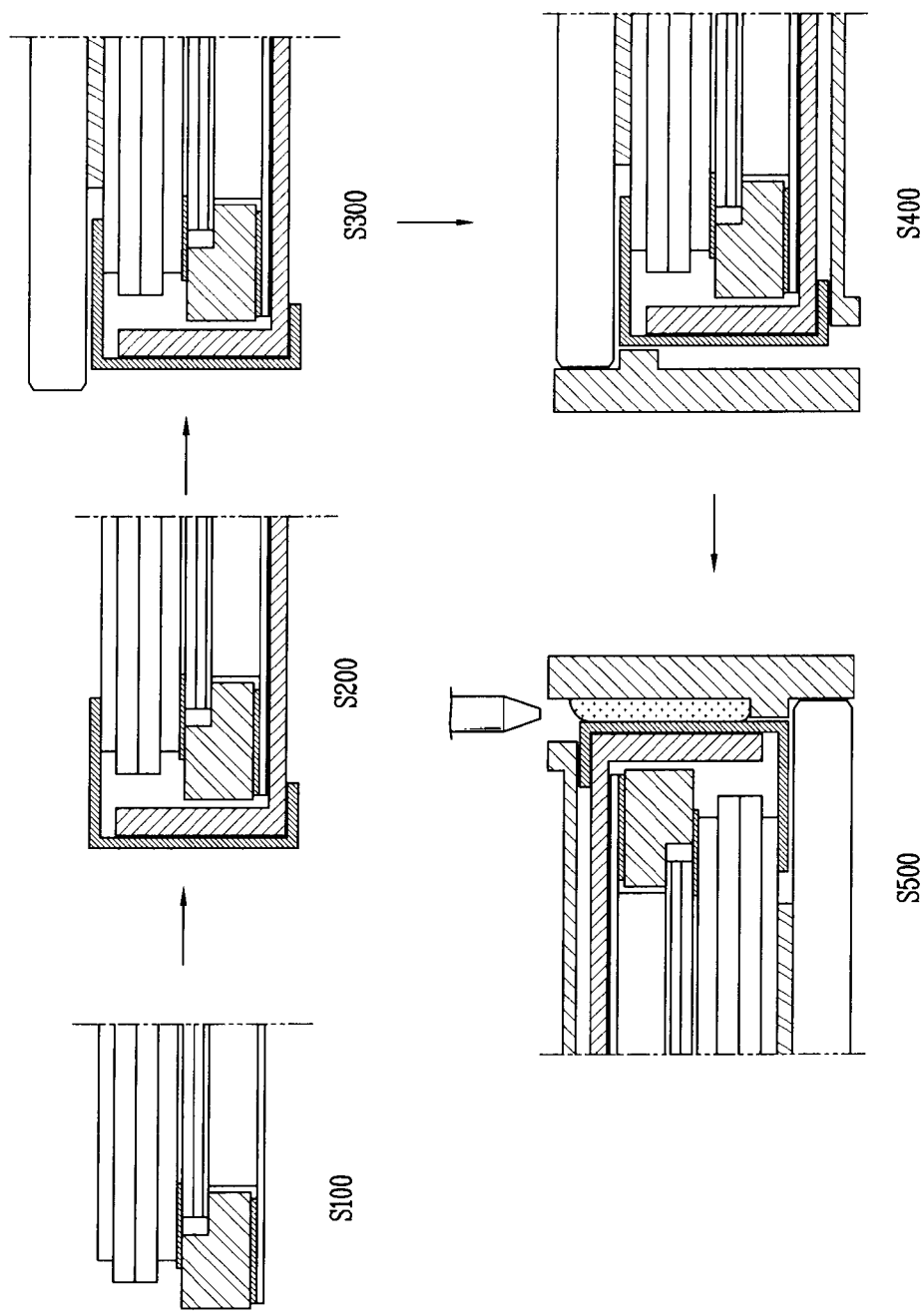
FIG. 19 is a partial cross-sectional view illustrating a process of manufacturing a mobile terminal according to the flow chart of FIG. 18.

FIG. 18 is a flow chart illustrating a method of manufacturing a mobile terminal in relation to an exemplary embodiment of the present disclosure, and FIG. 19 is a partial cross-sectional view illustrating a process of manufacturing a mobile terminal according to the flow chart of FIG. 18.

Operation S100 of forming layers forming a display module as a single module is to prevent delamination of the layers. Each of the layers may be bonded to other layers disposed on both surfaces thereof. A backlight unit mold is disposed on the edge of a backlight unit, and a display panel and a reflective plate are disposed on both surfaces of the backlight unit and bonded with the backlight mold unit by means of a double-sided tape. Accordingly, the layers forming the display may be formed as a single module.

During operation S200 of forming a penetration preventing unit on a lateral surface of the display, an adhesive tape is attached to a lateral surface of the display formed as a single module or couple the frame to the display module. The adhesive tape and the frame may form a single penetration preventing unit.

In a case in which the penetration preventing unit is formed as an adhesive tape, the adhesive tape is attached to at least portions of front and rear surfaces of the display and a lateral surface thereof. In a case in which the penetration preventing unit is formed as a frame, the display is inserted through one open surface at the side of the frame.

In a case in which the penetration preventing unit is formed of an adhesive tape and a frame, the adhesive tape may be attached to the lateral surface of the display and the frame may be coupled to an outer side of the adhesive tape, or the display and the frame may be first coupled and the adhesive tape may subsequently be bonded to an outer side of the frame.

During operation S300 of coupling a window to the display, a window is bonded to a front surface of the display having the penetration preventing unit formed therein. The window may be bonded to the display by an OCA or an OCR.

During operation S400 of inserting the display into the accommodation portion of the terminal case, the window forms one surface of the terminal and the display is installed to be disposed on a rear surface of the window.

During operation S500 of forming a bonding layer, an adhesive is injected into a space between the side of the accommodation portion and the penetration preventing unit through a slit formed along the edge of a bottom surface of the accommodation portion at the rear side of the case.

If an adhesive is first applied to the lateral surface of the accommodation portion and the display is coupled, the adhesive may be leaked through a gap between the window and the case. However, in the present disclosure, since the display is first coupled to the case and the adhesive is subsequently injected through the rear surface of the case, viscosity of the adhesive may be appropriately adjusted such that the injected adhesive is evenly spread between the penetration preventing unit and the side of the accommodation portion.

The bonding layer may be formed by hardening an injected hardener. During an operation of forming the bonding layer, ultraviolet rays may be irradiated to the adhesive in order to harden the adhesive, and by irradiating ultraviolet rays through the slit, discoloration occurring according to color of the window may be prevented.

Figure 20:
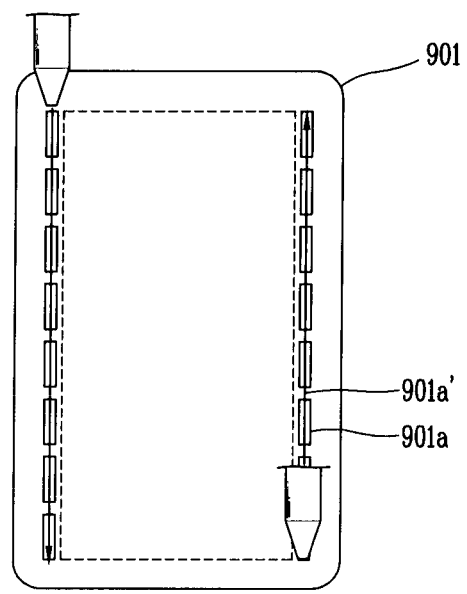
FIG. 20 is a plan view of a case illustrating formation of a bonding layer of a mobile terminal.

FIG. 20 is a plan view of a case illustrating formation of a bonding layer of a mobile terminal.

In order to form the bonding layer in the terminal, an adhesive may be injected by using a dispenser moving along two axes in the exemplary embodiment of the present disclosure. A plurality of slits 901*a* are formed along the edges of the bottom surface of the accommodation portion, and in this case, the slits 901*a* may be formed in a length direction of the terminal as illustrated. The slits 901*a* may be formed in the width direction of the terminal or may have a quadrangular shape along the length direction and the width direction of the terminal.

While moving in the length direction of the terminal along the two axes, the dispenser may inject the adhesive to each of the slits 901*a*, and while moving in the opposite direction, the dispenser may inject the adhesive to the other slits 901*a* formed in a row in positions spaced apart from the slits 901*a*.

In particular, when the dispenser drops the adhesive to the slits 901*a* through a nozzle thereof, while moving along the two axes, the dropped adhesive may flow between the case and the penetration preventing unit through the slits 901*a*, forming lateral coupling. Thus, the dispenser may not need to be rotated or moved along three or more axes, and thus, economical efficiency of manufacturing the mobile terminal may be enhanced.

The case 901 may have a plurality of slits formed on the edges of the bottom surface in order to inject an adhesive, and a bridge portion 901*a*' may be provided between the slits 901*a* in order to prevent a degradation of strength of the case 901.

In addition, in order to implement a bezel, whose size is smaller than 1 mm, a touch pattern may not be formed in the window, or a touch pattern may be implemented in an in-cell LCD or an active area.

The mobile terminal according to the embodiments of the present disclosure is not limited in its application of the configurations and methods, but the entirety or a portion of the embodiments may be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a case forming at least a partial exterior of a terminal body;
   a display module disposed in the case;
   a window covering one surface of the display module;
   a penetration preventing unit covering the lateral surface of the display module; and
   a bonding portion provided between inner sides of the case and the penetration preventing unit in order to bond the lateral surface of the display module to the inner side of the case facing the display module,
   wherein the penetration preventing unit is formed as at least one of an adhesive tape bonded to at least a portion of the display module and a frame supporting the display module.

2. The mobile terminal of claim 1, wherein the case has a plurality of slits formed on a bottom surface thereof to allow an adhesive to be injected therethrough from the rear side of the case to form the bonding portion.

3. The mobile terminal of claim 2, wherein the slits are formed on at least a portion of the terminal in a length direction and in a width direction.

4. The mobile terminal of claim 2, wherein the case has a bridge portion provided between the slits to connect the slits.

5. The mobile terminal of claim 1, wherein the case has a leakage preventing unit formed to be protruded from the case along the lateral edges thereof.

6. The mobile terminal of claim 1, wherein the penetration preventing unit covers at least a portion of the display module to allow the parts forming the display module to form a single module.

\* \* \* \* \*